June 14, 1966   W. J. CARTER, JR   3,255,597
METHOD AND APPARATUS FOR MAINTAINING TEMPERATURE IN AN ENCLOSURE
Filed Oct. 28, 1963   4 Sheets-Sheet 1

Fig. 1.

June 14, 1966  W. J. CARTER, JR  3,255,597
METHOD AND APPARATUS FOR MAINTAINING TEMPERATURE IN AN ENCLOSURE
Filed Oct. 28, 1963  4 Sheets-Sheet 3

INVENTOR.
William J. Carter, Jr.
BY
Poppe and Sommer
ATTORNEYS.

Fig. 6.

United States Patent Office 3,255,597
Patented June 14, 1966

3,255,597
METHOD AND APPARATUS FOR MAINTAINING TEMPERATURE IN AN ENCLOSURE
William J. Carter, Jr., Williamsville, N.Y., assignor to The Firewel Company, Inc., Buffalo, N.Y., a corporation of Ohio
Filed Oct. 28, 1963, Ser. No. 319,216
15 Claims. (Cl. 62—55)

This invention relates to a method and apparatus for maintaining the temperature of articles in a closed space, particularly of cargo in transit, and involves the use of a cryogenic liquid, such as liquid nitrogen, as a refrigerating medium, although in one form of the invention a heating medium is also employed when required.

One of the principal objects of the invention is to provide such a method and apparatus in which the flow of refrigerant is under exact control, this being achieved by controlling the flow of cryogenic liquid while it is in liquid form, rather than when partly converted to a gas, where problems of widely varying volume mitigate against accuracy of control, or when wholly converted to a gas in which case the control is complicated by the large size of both the instruments and the pipes or conduits for the cryogenic gas.

Another object is to provide such a control for the flow of a cryogenic liquid in response to the temperature of a space being served which has a very small number of components and a minimum of moving parts and which is rugged and will stand up under conditions of severe and constant use without getting out of order or adjustment.

Another object is to provide such an accurately controlled flow of cryogenic liquid, such as nitrogen in liquid form, which is controlled with a high degree of sensitivity in response to the temperature within the space being served.

Another object is to provide such an accurately controlled flow of cryogenic liquid, such as nitrogen, in liquid form, in which waste of the liquid or other adverse effects are avoided as the cargo being served is transported uphill and downhill to different elevations, the flow being controlled with a high degree of sensitivity independently of variations in ambient pressure, thereby to render the apparatus independent of altitude and ambient pressure variations.

Another object is to avoid waste of the cooling effect of the cryogenic fluid in exhausting the same from the space being served, this being accomplished, with cryogenic liquid developing heavier-than-air gas, such as liquid nitrogen, by exhausting the spent gas from the upper part of the space being served.

Another object is to provide a simple, reliable and highly accurate control for the admission of cryogenic fluid to the enclosed space, this being achieved through the use of a cryogenic liquid diaphragm flow control valve in which the diaphragm forms one wall of a control chamber the interior of which is in communication with a gas filled sensor tube in the enclosed space.

Another object is to increase the sensitivity of such a gas filled sensor tube, this being achieved by positively recirculating the gas contained therein.

Another object is to provide an effective means for setting the apparatus to maintain temperatures of different values in the enclosed space, this being done by the use of a diaphragm valve to control the discharge of cryogenic fluid into this enclosed space and providing an adjustable yielding back pressure against the valve head.

Figure 4:
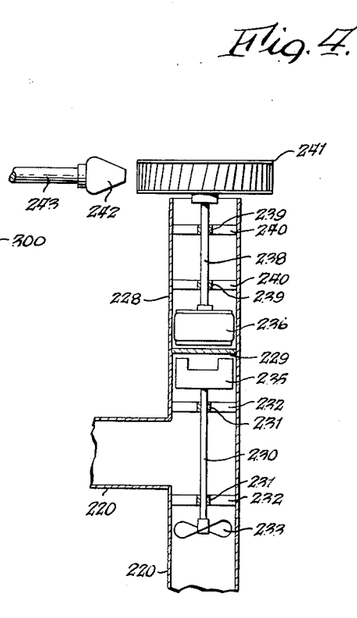
FIG. 4 is an enlarged longitudinal section through a turbine drive propeller illustrated in FIG. 1 and employed to circulate gas through a sensing tube which controls the valve releasing the cryogenic liquid in response to temperature in the body.
Figure 5:
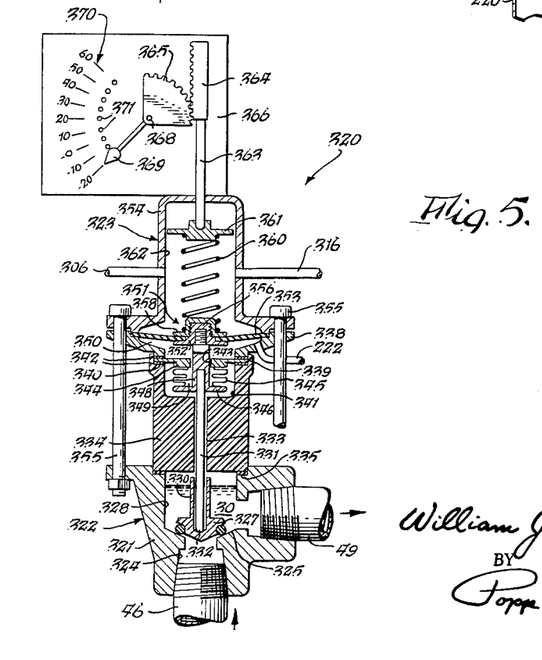
FIG. 5 is a view, similar to FIG. 2, on a reduced scale, and showing a modified form of the cryogenic liquid diaphragm flow valve illustrated in FIG. 2.

Another object is to provide such a means for adjusting the value of the temperature in the enclosed space which can be of very simple construction, such merely being in the form of a bellows having an enclosed space at one side in communication with the control chamber of the diaphragm valve and manually adjustable to provide to different volume in this chamber (FIGS. 1-4) or by varying a spring loaded back pressure against the valve head (FIG. 5).

Another object is to provide such apparatus which avoids the need for foreign control media, the control medium being in the form of gas generated from the cryogenic liquid and having its pressure adjusted in response to changes in ambient pressures and then being used as reference pressure in a diaphragm valve controlling the discharge of cryogenic liquid into the enclosed space.

Another object is to provide such apparatus which avoids the need for foreign control media, by employing the gas generated from the cryogenic liquid as the control medium in the sensor tube controlling the flow of cryogenic fluid to the storage space.

Another object is to provide efficient generation of gas from the cryogenic liquid, this being in the form of a heater into which controlled amounts of cryogenic liquid from the Dewar storage bottle are supplied.

Another object is to provide a simple and inexpensive Dewar bottle for the cryogenic liquid which can be arranged upright or on its side and which can readily be refilled with cryogenic liquid, the same pipe being used both as an inlet and outlet for the cryogenic liquid and being disposed to permit upright or on-the-side use of the Dewar bottle.

Another object is to provide a cargo truck in which different parts of its interior can be maintained at different temperatures, this being achieved by a closure partition movable across the interior of the body to divide it into two compartments and severally supplying cryogenic liquid to said compartments under individual control responsive to the temperature in each compartment.

Another object is to avoid waste of cryogenic liquid, this being achieved by providing means for cutting off the supply of cryogenic liquid to areas of the truck body or enclosed space which are unoccupied by cargo.

Another object is to provide for the safety of the worker or workers inside the body. This is accomplished by completely cutting off the discharge of cryogenic fluid into the storage space whenever the access door is opened.

Another object is to provide a form of the invention in which temperatures in a very wide range can be maintained, this form of the invention involving the alternate use of a heating medium and a cryogenic liquid as a cooling medium.

Another object is to provide such a control for the flow of a cryogenic liquid in response to the temperature of a space being served which is free from danger of leakage of the liquid from the various control components and in which these components will not ice up due to the presence of moisture therein, provision being made to purge them with moisture-free gas developed from the cryogenic liquid.

Other objects and advantages will be apparent from the following description and drawings in which.

FIGS. 1–4

Referring to the form of the invention illustrated in FIGS. 1–4, the numeral 10 represents the body of a highway refrigerator truck which is illustrated in dot-dash lines to have a bottom wall 11, front wall 12, roof 13 and side walls 14 with its open rear end closed by a door 15. Ordinarily this door 15 would be in the conventional form of a pair of swinging doors hinged on the side walls 14, but for schematic simplicity of illustration of this access door or doors 15 in conjunction with the control system, it is illustrated as being in the form of a single door which is pivoted to the bottom 11 to swing downwardly. A feature of the invention resides in the provision of louvered openings 16 in the upper part of the door or doors 15 through which the spent gas from the cryogenic liquid escapes to the atmosphere. The interior of the truck body 10 is shown as divided into two compartments 20 and 21 by a folding door 22 which folding door can include a thermal insulating material to thermally isolate the compartments 20 and 21 from each other, although it will be understood that any type of closure can be employed to segregate the compartments 20 and 21, it being a feature of the invention that different temperatures can be maintained in the compartments 20 and 21 to suit the products being transported.

Figure 1:
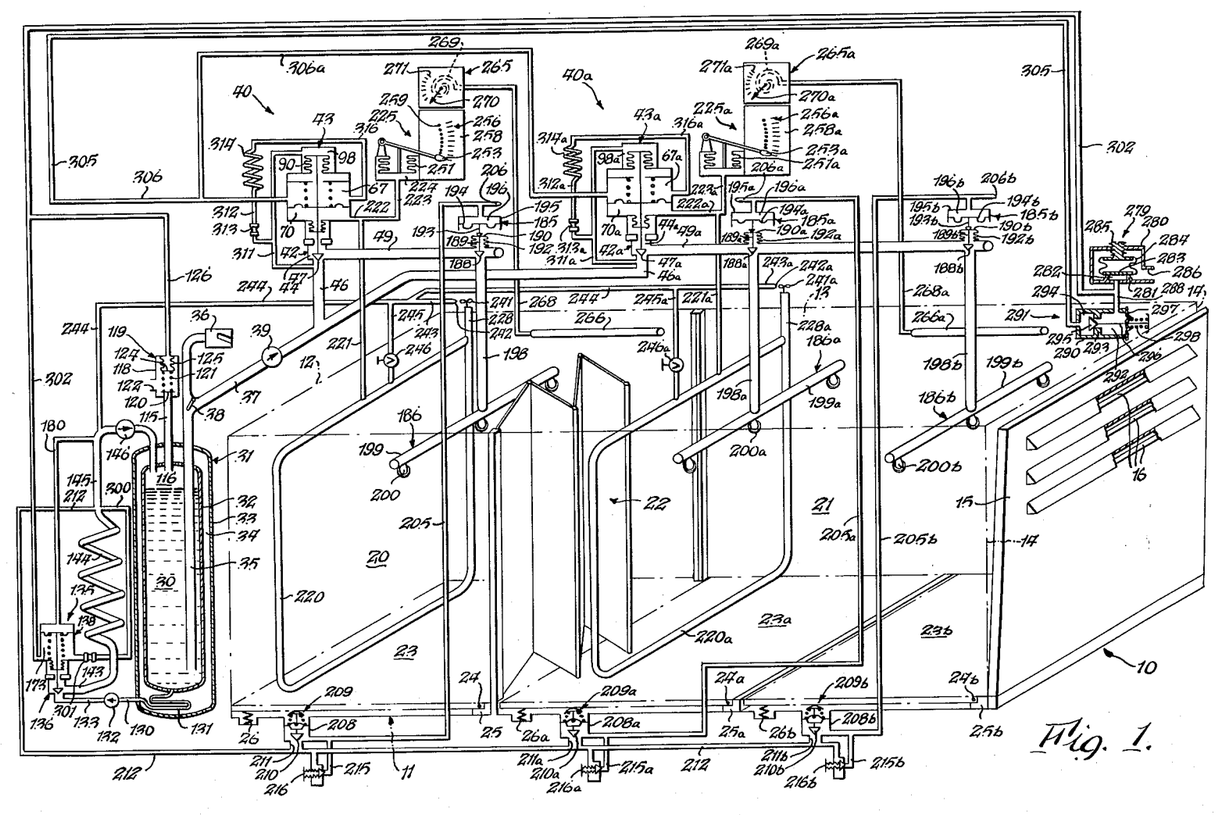
FIG. 1 is a perspective diagrammatic view showing one form of the apparatus of the present invention used for cooling the interior of the body of a refrigerated highway truck.

With further reference to the truck body 10, the floor thereof is shown as being in the form of three panels, 23, 23a, and 23b, the panel 23 forming the floor of the forward compartment 20 and the panels 23a and 23b jointly forming the floor of the larger rearward compartment 21. Each of these panels is shown as pivoted along its rear edge, as designated at 24, 24a, 24b, respectively, to a cross bar 25, 25a, 25b secured to the bottom 11 of the body and the forward edge of each of these panels is shown as biased upwardly into an elevated position by a helical compression spring 26, 26a, 26b, respectively, as hereinafter described, so that when the load is removed from any of these panels, 23, 23a, or 23b, the supply of cryogenic coolant to the space above the unloaded panel is cut off.

The cryogenic liquid 30, such as liquid nitrogen at a temperature of —320° F., is contained within a Dewar bottle, indicated generally at 31, having an inner container 32 and an outer container 33 with suitable insulation in the space 34 between these containers. This bottle can be either arranged upright or on its side and is provided with a tube 35 which, when the bottle is upright, extends through the upper end heads of the containers 32 and 33 and has its lower open end extending along one side of the container 32 and terminating close to the bottom of the inner container 32. The upper end of this tube 35 terminates in a filling coupling 36 and an outlet line 37 branches from the tube 35, a flap 38 of a flapper valve preferably being pivoted within the tube 35 at its juncture with the branch 37 and which flap is biased to direct the output from the Dewar bottle into the branch 37 but yielding under the flow of cryogenic liquid supplied from the inlet coupling 36 to permit filling of the bottle.

The cryogenic liquid outlet branch line 37 contains a check valve 39 and leads to two cryogenic liquid diaphragm flow valves 40 and 40a, the flow valve 40 controlling the flow of cryogenic liquid into the compartment 20 and the flow valve 40a controlling the discharge of cryogenic liquid into the compartment 21. Since these cryogenic liquid diaphragm flow valves 40 and 40a are identical in construction and operation a description of one will be deemed to apply to both, the corresponding parts of the flow valve 40a being distinguished by the suffix a.

Figure 2:
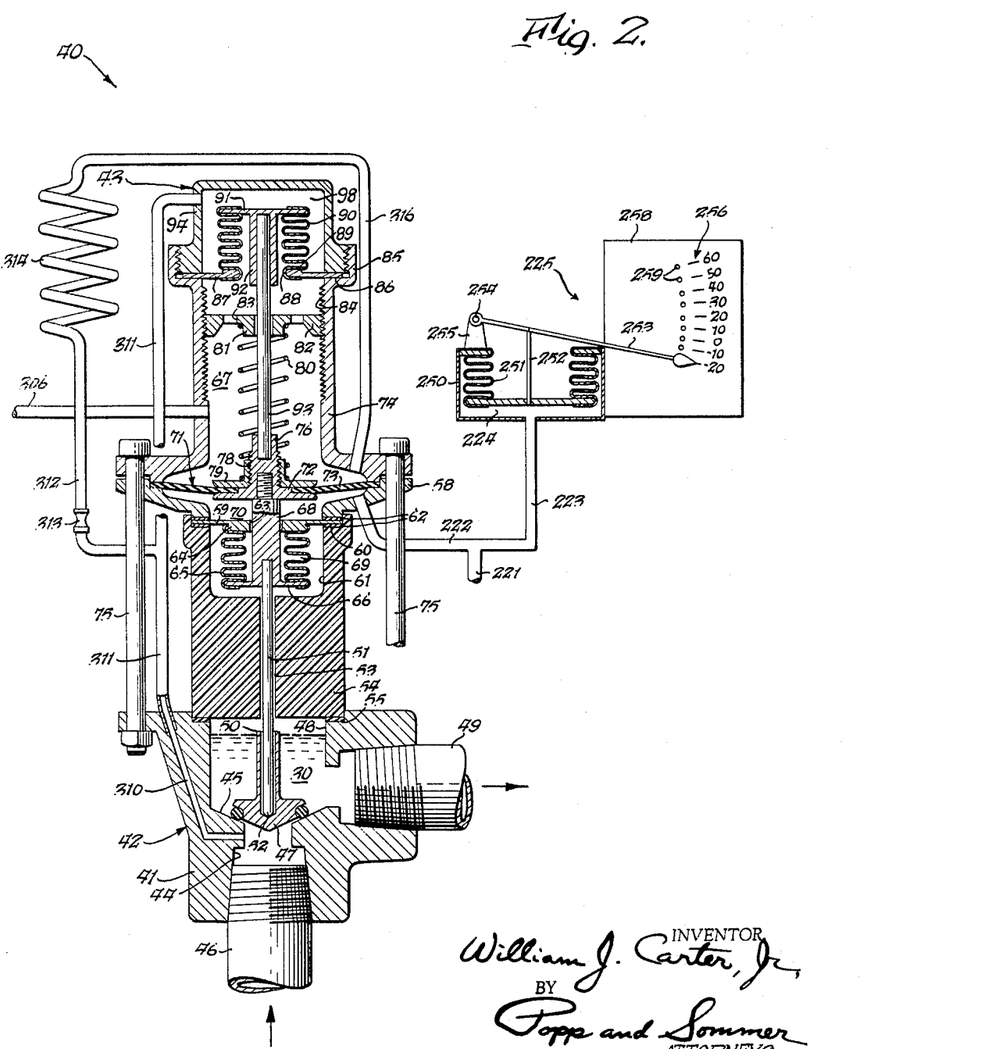
FIG. 2 is a greatly enlarged longitudinal section of the cryogenic liquid diaphragm flow valve 40 illustrated in FIG. 1 and which controls the release of the cryogenic fluid into the body of the truck.

Each of these cryogenic liquid diaphragm flow valves has a hollow body 41 of a flow valve section indicated generally at 42, the diaphragm control section for which flow valve section is indicated generally at 43. This flow valve section body 41 provides an inlet chamber 44 surrounded by a valve seat 45, the inlet chamber 44 being connected by a line 46 with the branch cryogenic liquid supply line 37. A valve head 47 in the outlet chamber 48 of the flow valve section body 41 controls the discharge of cryogenic liquid to an outlet line 49 through which the cryogenic liquid is discharged into the interior of the truck body as hereinafter described.

This valve head 47 is provided with an upright tubular valve stem 50 this stem being open at its outboard end and housing a rod 51 having its rounded contained end 52 seated against the valve head 47. This rod 51 extends through an oversize throughbore 53 of a block or head 54 of heat insulating material, preferably being made of glass and mica molded into the form of a cylinder, having one end seated against a gasket 55 surrounding and closing an opening to the inlet chamber 48 so as to provide a splash guard for the liquid nitrogen or other cryogenic liquid 30 contained therein.

The body 58 of the diaphragm control section 43, seats against the top of the marginal part of a disk 59 which in turn seats against an annular seat 60 surrounding the open end of a bellows chamber 61, the bellows chamber communicating with the oversize throughbore 53.

Gaskets 62 are interposed between the margin of the metal disk 59 and the block 54 and metal body 58, and the disk 59 has a central opening 63 and a downwardly projecting outwardly beaded annular flange 64 to the exterior of which is secured, as by welding, the upper end of an axially extensible metal bellows 65, this bellows preferably comprising a series of circular corrugations for this purpose. This bellows is preferably thin-walled and for this purpose made of nickel electro-deposited upon an erodible form (not shown) which is later removed. The lowest corrugation of this bellows is secured, as by welding, to the outer rim of a disk 66 which is integral with a pin 68 which projects upwardly through the opening 63 in the disk 59. The upper end of the valve stem 51 loosely seats against the lower end of the pin 68, and the chamber 69 within the bellows 65 is in communication, via the opening 63, with a diaphragm or control chamber 70 below a diaphragm indicated generally at 71. The chamber above this diaphragm is indicated at 67.

The diaphragm 71 is shown as comprising a central metal disk 72 to which a flexible disk 73 is suitably secured, the margin of this flexible disk being clamped against the top face of the metal body 58 by a cylindrical metal upper extension 74 of this body. The body parts 58 and 74 of the diaphragm control section 43 are shown as secured to each other and to the body 41 for the flow valve section 42 by tie bolts 75. The central disk 72 of the diaphragm 71 is shown as having a central hub 76 and the upper end of the pin 68 is shown as being threadedly secured to this hub 76. This hub 76 is also externally threaded to receive the hub 78 of a clamping disk 79 which clamps the central port of the flexible diaphragm disk 73 against the bottom disk 72. This clamping disk 79 also forms the seat for the lower end of a helical compression spring 80, the upper end of which bears against the downwardly projecting hub 81 of an externally threaded adjusting ring 82, this adjusting ring 82 having through openings 83. This adjusting ring is screwed into the internal thread 84 in the upper part of the central extension 74 of the body of the diaphragm control section 43.

The extreme upper end of the central body extension 74 of the diaphragm control section 43 is enlarged, as indicated at 85, this enlargement being internally threaded and providing a seat 86 and a disk 87. This disk is provided with a central opening 88 and an upwardly projecting outwardly beaded annular flange 89 to the exterior of which is secured, as by welding, the lower end of an axially extensible metal bellows 90, this bellows preferably comprising a series of circular corrugations for this purpose. This bellows is preferably thin-walled and for this purpose made of nickel electro-deposited upon on erodible form (not shown) which is later removed. The uppermost corrugation of this bellows is secured, as by welding, to the rim of a disk 91 which is integral with a pin 92 which projects downwardly through the opening 88 in the disk 87. A rod 93 has one end press fitted in the stem 76 and its opposite end press fitted in the stem 92.

The rim of the disk 87 is held against the seat 86 by the lower end of the cup-shaped cap 94 for the body of the diaphragm control section 43, the lower end of this cap 94 being externally threaded and screwed in the internally threaded upper end 85 of the cylindrical body section 74 to form a bellows chamber 98 for the bellows 90.

Referring to the Dewar bottle 31, the numeral 115 represents a tube having its open end in communication with the gas space 116 above the body 30 of cryogenic liquid, and its upper end extending into the body 118 of a vent relief valve 119 which is compensated for ambient pressures and forming a seat for a disk 120 held against the end of this tube 115 by a helical compression spring 121. This vent relief valve 119 which is compensated for ambient pressures 118 is vented to the atmosphere as indicated at 122 and the upper end of the helical compression spring 121 seats against a disk 124 forming the lower end head of an axially extensible bellows 125. The opposite end of this bellows is secured, as by welding, to the end head of the vent relief body 118 and a control line 126 communicates with the interior of the bellows 125 ond controls the action of the vent relief valve 119 in response to ambient pressure variations as hereinafter described. It is important that the area of the valve seat at the upper end of the tube 115 be equal to the effective area of the bellows 125.

The lower end of the body of cryogenic liquid 30 in the Dewar bottle 31 is in communication with a tube 130 having a number of convolutions 131 in the space 34 between the two containers 32 and 33 of the Dewar bottle and extending through the wall of the outer container 33 to connect with a check valve 132 which opens away from the Dewar bottle 31. The opposite side of this check valve 132 is connected by a line 133 with the inlet to the body 139 of a cryogenic liquid diaphragm flow valve 135 which is illustrated in detail in FIG. 3.

Figure 3:
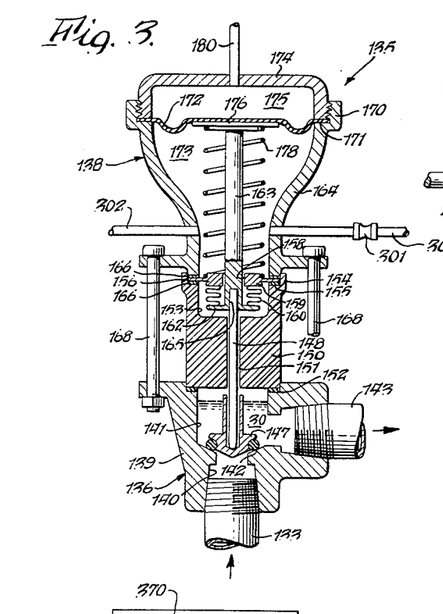
FIG. 3 is a longitudinal sectional view, on an enlarged scale, of the cryogenic liquid diaphragm flow valve 135 illustrated in FIG. 1 and which controls the flow of cryogenic liquid to a heater in which gas is generated as a control medium.

This cryogenic liquid diaphragm flow valve 135 has a flow valve section indicated generally at 136 and a diaphragm control section indicated generally at 138. The flow valve section comprises a metal valve body 139 having an inlet chamber 140 connecting with the line 133 and an outlet chamber 141. A valve seat 142, facing toward the outlet, is interposed between these chambers. The outlet chamber 141 discharges into a pipe 143 leading to a heating or gas generating coil 144 externally exposed to ambient and in which the cryogenic liquid is heated to gas form. The opposite end of the heating coil 144 is connected by a pipe 145 with the gas space 116 in the upper end of the inner container 32 of the Dewar bottle, a check valve 146, opening toward the gas space, being contained in this pipe 145.

The outlet chamber 141 is closed by a block 150 of heat insulating material preferably being made of glass and mica molded into the form of a cylinder and having a central through opening 151 through which the valve stem 148 projects and having the bottom of its rim seated against a gasket 152 around the open end of the outlet chamber 141 so as to provide a splash guard for the liquid nitrogen or other cryogenic liquid 30 contained therein.

A valve head 147 seats against the seat 142 and is in contact with the pointed end of a stem 148 projecting out through the outlet chamber 141. The block 150 of heat insulating material is provided at its end opposite the flow valve section 136 with a bore forming a bellows chamber 153, the block being provided around this bellows chamber with a rim 154 which forms a seat 155 for a disk 156 having a central opening 158. This disk is provided with a downwardly projecting outwardly beaded annular flange 159 to the exterior of which is secured, as by welding, the upper end of an axially extensible metal bellows 160, this bellows preferably comprising a series of circular corrugations for this purpose. This bellows is preferably thin-walled and for this purpose made of nickel electro-deposited upon an erodible form (not shown) which is later removed. The lowest corrugation of this bellows is secured, as by welding, to the rim of a disk 162 having an integral stem 163 projecting upwardly into the body 164 of the diaphragm control section 138. This valve stem 148 has a loose fit in the end bore 165 provided in the lower end of the stem 163.

The lower end of the metal body 164 of the diaphragm control section 138 seats into the enlargement 154 against the rim of the disk 156, suitable gaskets 166 being interposed between these parts. The body 164, as well as the insulation block 150, is secured to the flow valve body 136 by tie bolts 168.

The outboard end of the body 164 is provided with a rim in the form of an internally threaded annular enlargement 170 forming a seat 171 for a flexible diaphragm 172 across the body 164 and forming a chamber 173 in this body. This diaphragm is held in position by an externally threaded cap 174 screwed into the internally threaded rim 170 in clamping relation to the rim of the diaphragm 172 and forming with this diaphragm a chamber 175. The diaphragm is provided on its side facing the flow valve section 136 with a disk 176 against which the outboard end of the stem 163 bears, and a helical compression spring 178 is interposed between this disk 176 and the disk 156 which carries the bellows 160. A line 180, connects the chamber 175 with the outlet line 145 from the gas generating or heating coil 144 which converts the cryogenic liquid to gas form.

The outlet line 49 from the cryogenic liquid diaphragm flow valve 40 connects with a diaphragm shut-off valve 185 serving an overhead spurge line or spray tree 186 serving the compartment 20 and the cryogenic liquid outlet line 49a of the cryogenic liquid diaphragm flow valve 40a connects with a pair of diaphragm shut-off valves 185a and 185b serving overhead spurge lines or spray trees 186a and 186b serving the front and rear portions of the compartment 21, respectively. Since these structures are identical in construction, a description of one will be deemed to apply to all three, the parts associated with the diaphragm shut-off valves 185a and 185b being distinguished by the suffixes a and b, respectively.

The diaphragm shut-off valve 185 comprises a valve head 188 seating in the direction of the flow of the cryogenic liquid and having a stem 189 connected to a disk 190 at the outboard end of a bellows 192. The exterior side of the disk 190 is connected by its stem 193 with a diaphragm 194 the opposite face of which is enclosed by a body 195 to provide a diaphragm chamber 196.

The outlet line 198 from the diaphragm shut-off valve 185 connects with a horizontal pipe 199 having a plurality of nozzle holes 200 for discharging the cryogenic liquid, in gas or liquid form, into the interior of the body 10.

Control lines 205, 205a, 205b connect with the diaphragm chambers 196, 196a, 196b of each diaphragm shut-off valve 185, 185a, and 185b, respectively, and also connect with bleed orifices 206, 206a, 206b discharging to ambient. The other ends of the control lines 205, 205a and 205b connect with the bodies 208, 208a 208b of three normally open floor panel valves 209, 209a, 209b, respectively, having valve heads 210, 210a, 210b seating downwardly to break communication between the lines 205, 205a, 205b and the inlets 211, 211a, 211b of these valves which inlets connect with a line 212 deriving cryogenic gas from the warm end of the heating coil 144 and serving the inlets of all of the floor panel valves 209, 209a and 209b. A bypass line 215, 215a, 215b around each of these normally open valves 209, 209a, 209b, respectively, connects the supply line 212 with the control line 205 and each bypass line is under control of a manually operated valve 216.

Means are provided for setting the temperature to be maintained in the corresponding compartment by each of the cryogenic liquid diaphragm flow valves 40, 40a, these means also including a thermostat to indicate the temperature in these compartments. Since these means are identical for each of the cryogenic liquid diaphragm flow valves 40, 40a the same description will be deemed to apply to the corresponding parts, these parts for the cryogenic liquid diaphragm flow valve 40a being distinguished by the suffix a.

The numeral 220 represents a temperature sensing tube of any desired shape and positioned in any suitable manner within the compartment 20 which it controls. As shown, this tube 220 is in the form of an endless rectangle with its legs close to the top wall 13, side walls 14, bottom panel 23 and front wall 12. By this arrangement its sensitivity as a sensor is not affected to any undue extent by any temperature differential between any of these walls so that it is sensitive to the average temperature conditions within the compartment. For example, if the truck is standing with one side wall 14 to the sun, only one vertical leg of the sensing tube 220 will be raised to an undue extent by this abnormal condition.

This tube can be of any suitable form and draped around the compartment to be controlled in any suitable manner and need not be endless, the only requirement being that it be a closed tube and connect with a line 221 having one branch 222 communicating with the diaphragm control chamber 70 and another branch 223 communicating with a bellows chamber 224 of a temperature controller indicated generally at 225. However, for greater sensitivity of the sensor tube 220, means are provided for circulating the gas, preferably nitrogen or other gas derived from the cryogenic liquid 30, through the interior of the sensor tube 220 so as to provide improved heat transfer between the wall of this tube and the contained gas.

To this end the tube is shown as being of endless rectangular form and at one corner, as best illustrated in FIG. 4, having a non-magnetic extension 228 in line with one of the legs or sides of the sensor tube and forming a continuation thereof. In this extension 228 is arranged a non-magnetic transverse partition 229 which seals the interior of the sensor tube 220 from ambient. Within the tube 220 in line with the extension 228 there is journalled a fan shaft 230, this shaft being shown as journalled in a bearing 231 carried by spiders 232. Within the sensor tube 220 an airplane propeller type fan 233 is secured to the fan shaft 230 so that upon turning the fan shaft 230, the contained gas will be circulated through the several legs or sides forming the endless rectangular sensor tube 220.

To the opposite end of this fan shaft is secured a permanent magnet 235 preferably having its poles projecting toward the non-magnetic partition 229 and magnetically coupling with a hysteresis core or other type of magnet 235 on the opposite side of the partition. This hysteresis core is fast to a drive shaft 238 in line with the fan shaft 230 and journalled in bearings 239 carried by spiders 240 supported by the walls of the non-magnetic extension 228. This drive shaft 238 projects beyond the open outboard end of this extension 228 and has a turbine wheel 241 fixed thereto. This turbine wheel is rotated by the discharge from a nozzle 242 striking its vanes.

This nozzle 242 is at the end of a small tube 243 forming a branch of a tube 244 connecting with the gas end of the heating coil 144 in advance of the check valve 146. The line 243 serving the turbine wheel 241 also has a branch 245 containing a manual adjustment valve 246, the sole purpose of this valve being to adjust the pressure of the gas contained within the sensor tube 220 to the desired value.

The temperature controller 225 includes a body 250 enclosing the chamber 224 and one wall of which is formed by a bellows 251 exposed on its interior side to ambient. A rod 252 secured to the end of this bellows projects outwardly from this bellows and from the body 250 and connects with an arm 253 which is pivoted, as indicated at 254, on a bracket 255 carried by the body 250. The outboard end of this arm 253 is in the form of a point sweeping across a calibrated scale 256 on a panel 258. This calibration is in degrees of temperature and each calibration has associated therewith a detent projection or indentation 259 which mates with a companion detent depression or projection (not shown) on the arm 253. By this means this arm 253 can be set to any calibration on the scale 256 and the corresponding detent 259 serves to hold it in this position.

Associated with each temperature controller is a gas thermometer indicated generally at 265 which can be of any suitable construction to indicate the temperature at the compartment under control. As shown this thermometer comprises a sealed tube 266 within the compartment 20 and connected by a line 268 with one end of a Bourdon tube 269 which actuates a pointer 270 transversing a scale 271 which is also calibrated in degrees of temperature. By this arrangement the operator can observe whether or not the temperature called for by his setting of the arm 253 has been reached by observing the actual temperature in the compartment as indicated by the pointer 270.

An important feature of the invention resides in the provision of an altitude compensating aneroid valve, indicated generally at 279, to hold a constant absolute control pressure in spite of variations in ambient pressure so that the truck can travel from one elevation to another with the same temperatures being maintained in the compartments 20 and 21 and without waste of cryogenic liquid. This aneroid comprises a casing 280 having one wall formed to provide an annular valve seat 281 surrounding a chamber 282. This valve seat is engaged by the end head 283 of a sealed aneroid bellows 284 the opposite end head of which is fixed to a screw 285 adjustably screwed into the corresponding side wall of the body 280. Externally of the aneroid bellows 284, the interior of the body 280 is open to ambient via a vent 286. It is an important feature of this aneroid valve that the effective area of the valve seat 281 is equal to the effective area of the aneroid bellows 284.

The chamber 282 is connected by a line 288 to the interior of the body 290 of a safety shut-off valve, indicated generally at 291, and which is actuated in response to the opening and closing of the door 15. Line 288 connects with the inlet chamber 292 of this safety shut-off valve and a valve seat 293 separates this inlet chamber from an outlet chamber 294 which it faces. This valve seat is enclosed by a valve head 295 on the stem 296 of which projects outwardly through the inlet chamber 292 and externally of the body 290, and the outboard end of this stem 296 is engaged by the door 15 when it is closed thereby to open the valve 291. A diaphragm 297 is shown as preventing leakage past the valve stem 296 and a spring 298 normally biases this safety shut-off valve 291 to its closed position.

A line 300, FIG. 1, supplies gas from the top of the heating or gas generating coil 144 through a restriction 301 to the chamber 173, FIG. 3, of the cryogenic liquid diaphragm flow valve 135. The pressure in this chamber 173 is altitude compensated via a line 302 connecting at its other end, FIG. 1, with the line 288 to the altitude compensating aneroid valve 279 which serves to hold a constant absolute pressure in this line 302 and chamber 173 in spite of falling ambient pressures as the truck climbs to or descends from higher altitudes. The line 126, FIG. 1, in communication with the interior of the bellows 124 of the vent relief valve 119 also connects with this line 302 leading to and controlled by the altitude compensating aneroid valve 279.

Beyond the cryogenic gas line 181 connecting the gas end of lines 306, 306a communicating, respectively, with the diaphragm chambers 67 and 67a of the diaphragm control sections 43 and 43a of the cryogenic liquid diaphragm flow valves 40, 40a, respectively.

In each cryogenic liquid diaphragm flow valve 40, 40a, its inlet chamber 44, 44a of its flow valve section 42, 42a is connected by a duct 310, 310a (FIG. 2) with a line 311, 311a communicating with the bellows chamber 98, 98a. A branch 312, 312a, containing a restriction 313, 313a, connects with one end of a heating or gas generating coil 314, 314a which is exposed to ambient and which serves to convert the cryogenic liquid to a gas. This gas is lead from the outlet of this heating coil by a line 316, 316a to the chamber 67, 67a.

OPERATION OF FIGS. 1–4

Refilling

The refrigeration truck body spaces 20 and 21, which are assumed to be filled with the merchandise to be kept under refrigeration, and generally thermally isolated from each other by the door or closure 22 being closed, are cooled by the cryogenic liquid 30, such as liquid nitrogen at −320° F., contained within the inner container 32 of the Dewar bottle 31, which, when it is exhausted, is refilled with cryogenic liquid from the inlet filling coupling 36, the incoming cryogenic liquid opening the flap 38 and flowing down the tube 35 to fill the inner container 32. In this connection, the Dewar bottle 31 can be either vertical, as shown, or horizontal.

Flow of cryogenic liquid

In so cooling the compartments 20 and 21 of the refrigeration truck body 10, cryogenic liquid flows out the tubes 35 and 37 past the check valve 39, and into the branch tubes 46 and 46a of the two cryogenic liquid diaphragm flow valves 40 and 40a which open when cooling is called for. With the valve heads 47, 47a of these cryogenic liquid diaphragm flow valves 40, 40a open, the cryogenic liquid flows into the tubes 49, 49a and past the open diaphragm shut-off valves 185, 185a, 185b into the tubes 198, 198a, 198b supplying the spray trees or spurge lines 186, 186a and 186b. This cryogenic liquid is then discharged from the nozzles 200, 200a, 200b of these spray trees into the upper parts of the compartments 20 and 21 either in liquid or gaseous form but immediately is converted into a gas surrounding the articles contained within the refrigeration compartments 20 and 21 to chill the same and maintain them at the desired low temperature.

Exhaust of spent gas

This gas is, of course, heated in its service within the compartments 20 and 21 and this heavier-than-air heated gas flows toward the rear of the truck body 10 and rises to escape through the louvered openings 16 in the upper part of the rear door 15 for the truck body. By exhausting heavier-than-air spent nitrogen from the upper part of the body, it is retained in the body for maximum time to avoid waste of its cooling effect as compared with permitting it to spill out from a lower part of the body with a part of its cooling effect unused.

Low temperature control

When the temperature within either of the thermally isolated compartments 20 or 21 (the door 22 is assumed to be closed) falls to the set temperature for that compartment, the flow of cryogenic fluid to that compartment will be cut off or reduced to that value required merely to maintain the predetermined temperature. Thus, assuming this to be the compartment 20, as the temperature within this compartment drops toward the set temperature (determined by the setting of the temperature controller 225 as hereinafter described), the gas contained within the closed sensor tube 220 contracts and reduces in pressure. This in turn, through the tubes 221 and 222, reduces the pressure in the control chamber 70 of the diaphragm control section 43 of the cryogenic liquid diaphragm flow valve 40. This in turn moves the diaphragm 71 toward the thermal insulation block 54, thereby to move the pin 68 and rod 51 in the direction to close the valve head 47 against the seat 45. When this occurs, the flow of cryogenic liquid to the spray tree 186 (via the lines 46, 49 and 198) for the compartment 20 is reduced or cut off until further cooling is called for, as hereinafter described.

In similar manner, when the temperature in the assumed to be isolated compartment 21 falls to the setting for this compartment, the pressure of the gas in its sensor tube 220a falls thereby, through the lines 221a, 222a, reducing the gas pressure in the control chamber 70a of the cryogenic liquid diaphragm flow valve 40a, thereby to move the valve head 47a toward its closed position to reduce or cut off the flow of cryogenic liquid to the line 49a and the spray trees 186a and 186b for the compartment 21.

Supply of gas from cryogenic liquid for control purposes

The gas within each sensor tube 220, 220a is preferably nitrogen or other gas derived from the cryogenic liquid 30 in the Dewar bottle 31 under control of the shut-off valves 246, 246a, respectively. This cryogenic liquid 30 in the Dewar bottle 31 is converted into such gaseous form on passage through the heating coil 144 which also supplies gas for other control purposes. The required small amount of gas for control purposes is supplied by supplying the cryogenic liquid 30 in the Dewar bottle 31 to this heating coil 144 via the small coil 131 in the insulation space 34 of the Dewar bottle, check valve 132, line 133, cryogenic liquid diaphragm flow valve 135 and inlet end 143 of this heating coil. This heating coil is exposed to ambient, and the cryogenic liquid is vaporized therein and is supplied from its outlet 145 to the lines 244, 245 and 245a, to drive the turbine wheels 241 and 241a and to refill the sensor tubes 220, 220a (by the shut-off hand valves 246 and 246a) as previously described. Valves 246 and 246a are closed tightly after charging the sensor tubes 220 and 220a.

This gas from the heating coil 144 is also supplied to the gas space 116 in the top of the Dewar bottle 31 via the check valve 146 in the outlet 145 from this heating coil to maintain the desired back pressure against the cryogenic liquid 30 in this bottle as determined by the vent relief valve 119.

Operation of the sensor tubes 220, 220a

It will be noted that the gas filled sensor tubes 220, 220a are close to different walls of the body 10 so as to be responsive to average temperatures in the compartments 20 and 21. Thus if one wall, say the roof 13, is exposed to the sun, its higher temperature will affect only the horizontal top legs of the sensor tubes 220, 220a.

Also to render these sensor tubes 220, 220a still more sensitive, each is provided with a small fan or blower to circulate the gas around their closed circuits so as to provide moving air in contact with the inside surfaces of these sensor tubes for improved heat transfer and also to equalize any abnormally warm sections of the sensor tubes, such as the horizontal top leg with the sun heating the roof of the body 10.

Thus, referring to the sensor tube 220 (and the same description applying to the sensor tube 220a) a constant small stream of pressurized gas from the cryogenic gas line 243 is discharging from the nozzle 242 (FIG. 4) against the turbine wheel 241, this rotating the permanent magnet 236 in the tube extension 228 coaxially therewith. This induces similar rotation of the permanent magnet 235 in the trapped gas contained within the sealed sensor tube 220, thereby to rotate the propeller type fan 233 to so circulate the gas around the closed circuit in the sensor tube.

*Maintaining constant temperature*

The action of the sensor tubes 220, 220a in controlling the cryogenic liquid diaphragm flow valves 40, 40a to maintain the desired temperature in the compartments 20 and 21 of the space to be refrigerated is as follows:

As previously described, these sensor tubes 220, 220a are filled, via the valves 246, 246a, with gas developed from the cryogenic liquid, a predetermined gas pressure being maintained in the sensor tubes and, for sensitivity, this gas being recirculated by the fans 233 (FIG. 4) driven by the turbine wheels 241, 241a.

Confining attention to the sensor tube 220, as the temperature in the compartment 20 rises above the set temperature, the gas in the sensor tube 220 expands thereby, through the lines 221 and 222, increasing the pressure in the control chamber 70 below the diaphragm 71 controlling the cryogenic liquid diaphragm flow valve 40. This raises the diaphragm thereby to lift the valve head 47 and permit more cryogenic liquid to flow through the spray tree 186 into the refrigerated chamber 20. This reduces the temperature in this chamber, thereby to cool and contract the body of gas in the sensor tube 220, thereby, through the lines 221 and 222 to reduce the pressure in the control chamber 70 of the cryogenic liquid diaphragm flow valve 40, and to close its valve head 47 to reduce the flow of cryogenic liquid into the refrigerated space 20.

The sensor tube 220a acts in the same manner to control the cryogenic liquid diaphragm flow valve 40a in regulating the discharge of cryogenic liquid from the spray tree 186a and this description will not be repeated.

The temperature to be maintained in either the compartment 20 or 21 of the space to be refrigerated is set as follows:

Confining attention to the temperature controller 225 (FIGS. 1 and 2) if the operator desires to maintain a lower temperature in the compartment 20, he manually adjusts the pointer 253 downwardly along the calibrated scale 256, say, to the —20° position as illustrated in FIG. 2, this pointer being held at any set position by the corresponding detent 259. Through the rod 252 this expands the bellows 251 thereby to increase the gas pressure in the bellows chamber 224. Through the lines 223 and 222, this increases the pressure in the chamber 70 below the diaphragm 71 in the cryogenic liquid diaphragm flow valve 40 thereby to raise the valve head 47 and permit more cryogenic liquid to flow through this flow valve 40 to the spray tree 186 serving the refrigerated compartment 20. At the same time, through the lines 221, this raises the gas pressure in the sensor tube 220 so that the entire gas pressure sensor and control system is set at a higher pressure level to maintain the lower temperature in the refrigerated compartment 20.

This falling temperature in the refrigerated compartment 20 cools and contracts the gas in the sensor tube 266 (FIG. 1) which through the line 268 reduces the pressure in the Bourdon tube 269 thereby to swing the pointer of the thermometer 265 down the temperature scale. With the temperature controller 225 and thermometer 265 properly calibrated, their pointers will indicate the same temperature under normal running conditions and the operator can readily check any unusual condition indicated by a variation of these instruments.

If a higher temperature is wanted in the compartment 20, the operator moves the pointer 253 (FIG. 2) upwardly along the graduated temperature scale 256, this lowering the gas pressures in control system served by the gas sensor tube 220 and also the thermometer system served by the gas sensor tube 266.

The operation of the temperature controller 225a and thermometer 265a in adjustably regulating and indicating the temperature in the compartment 21, is identical to that described above and the operation of the parts of this system, distinguished by the suffix a, will not be repeated.

It will be appreciated, of course, that a different temperature, say —60° F., can be maintained in the refrigerated compartment 20 as compared with the temperature, say —40° F., maintained in the compartment 21, this being a feature of the invention.

This gas from the gas generating or heating coil 144 (FIG. 1) is also supplied to the supply line 212 serving the floor panel valves 209, 209a and 209b as well as the diaphragm shut-off valves 185, 185a, 185b.

This gas from the gas generating or heating coil 144 (FIG. 1) is also supplied to the supply line 180 serving the cryogenic liquid diaphragm flow valve 135 which controls the release of cryogenic liquid to this gas generating or heating coil 144.

This gas from the gas generating or heating coil 144 (FIG. 1) is also supplied via the line 300 and restriction 301 to the chamber 173 of the cryogenic liquid diaphragm flow valve 135 and through this chamber to the lines 302 and 126 serving the bellows 125 of the vent relief valve 119. The absolute pressure in these lines 302, 126, bellows 125 of vent relief valve 119 and chamber 173 of the cryogenic liquid flow control valve 135 is held constant in spite of any variation in altitude by the altitude compensating aneroid valve 279.

Gas for the operation of the cryogenic liquid diaphragm flow valve 40 is generated in the heating or gas generating coil 314 (FIG. 1) from a part of the cryogenic liquid supplied to this flow valve, via the line 312 and restriction 313. This gas is supplied to the chamber 67 of the flow valve and thence to line 306 which, via line 305, door-operated safety shut-off valve 291, and line 288 is maintained at a constant pressure by the aneroid valve 279 to overcome the effects of changes in altitude and ambient pressure.

Gas for the operation of the cryogenic liquid diaphragm control valve 40a is supplied from line 306 via line 306a.

*Control pressure rendered independent of barometric pressure and hence changes in altitude*

An important feature of the invention resides in maintaining a constant absolute reference pressure for the cryogenic liquid diaphragm flow valve 135 serving the heating or gas generating coil 144; for the vent relief valve 119 of the Dewar bottle 31; and also for each of the cryogenic liquid diaphragm flow valves 40, 40a serving the spurge lines or spray trees 186, 186a, 186b, this maintenance of a constant absolute reference pressure in spite of changes in ambient pressure, thereby to render the operation of these instruments independent of changes in altitude of the vehicle being served. The purpose of so maintaining this reference pressure constant is to maintain accuracy of temperature control and to avoid useless loss by boiloff of the cryogenic liquid as the truck goes to higher elevations, or loss of Dewar bottle head pressure as the truck descends to lower altitudes when saturated liquids are used in the Dewar bottle.

For the vent relief valve 119 of the Dewar bottle 31 and for the cryogenic liquid diaphragm flow control valve 135 serving the heater or gas generating coil 144, this independence from changes in ambient pressure and altitude is obtained from the aneroid valve 279. Thus a small supply of gas generated in the heating or gas generating coil 144 is supplied from this coil via line 300 and restriction 301 to the chamber 173 (FIGS. 1 and 3) of the cryogenic liquid diaphragm flow valve 135 and thence through lines 302 and 288 to the altitude compensating aneroid valve 279. When this pressure overcomes the force of the sealed evacuated bellows 284 it pushes open the valve head 283 and escapes to ambient via the vent 286. The exterior of this sealed bellows 284 is exposed to ambient via this vent. Since the effective area of this bellows 284 is equal to the effective area of the valve seat 281, variations in ambient pressure have no effect toward opening or closing the end head 283 of this bellows or away from or against the seat 281. Accordingly this end head 283 is opened and closed only in response to variations in pressure in the line 288 and serves to maintain a constant reference pressure in this line and hence in lines 302, 126, bellows 125, chamber 173 and lines 305, 306, 306a and chambers 67, 67a. This constant absolute pressure is a function of the spring pressure exerted on the bellows 284 and its end head 283 against the seat 281.

*Vent relief valve for cryogenic liquid supply rendered independent of barometric pressure and hence altitude*

This constant absolute reference pressure in the control lines 282, 302, 126 serves to render the action of the relief valve 119 for the Dewar bottle 31 independent of changes in barometric pressure hence changes in altitude. Thus at higher altitudes the constant absolute pressure maintained in the control lines 302, 126 (effected by the eneroid valve 279), is also maintained in the bellows 125 of the vent relief valve 119 for the Dewar bottle 31 thereby to maintain a constant absolute pressure in this Dewar bottle at high or low altitudes and at corresponding low or high barometric pressure, thereby to avoid the increased boiloff and needless loss of the cryogenic liquid 30 in this Dewar bottle as compared with if the back pressure against the valve disk were merely ambient plus the pressure of spring 121.

*Cryogenic liquid flow control to heater rendered independent of barometric pressure and hence altitude*

Also this constant absolute reference pressure in the control lines 288, 302 serves to render the action of the cryogenic liquid diaphragm flow valve 135 (FIGS. 1 and 3) independent of changes in barometric pressure and hence changes in altitude. This cryogenic liquid diaphragm flow valve 135 controls the cryogenic liquid flow to the heater 144 in which the liquid is gasified for control purposes and to drive the turbine wheels 241. By maintaining a constant absolute reference pressure in the chamber 173, excessive gas is not generated to provide head pressure in the Dewar bottle 32 which excess would be lost through the safety relief valve 119.

*Cryogenic liquid diaphragm control valves 40, 40a rendered independent of barometric pressure and hence altitude*

The action of the cryogenic liquid diaphragm flow valves 40, 40a is also rendered independent of ambient pressures and hence changes in altitude of the truck, thereby to insure accuracy in the control of these valves by the confined body of gas in the temperature responsive sensor tubes 220 and 220a, respectively. Confining attention to the cryogenic liquid diaphragm flow valve 40 (FIGS. 1 and 2) a small amount of cryogenic liquid is permitted to escape by the restriction 313 to the heating coil 314 where it is converted into gas. Through the line 316, chamber 67 and lines 306, 305 this gas flows through the shut-off valve 291 (which is open whenever the truck access door 15 is closed) to the line 288.

The back pressure in this line 288 is under control of the aneroid valve 279 which serves to maintain a constant absolute pressure in this line 288 and hence in the chamber 67 of the cryogenic liquid diaphragm control valve 40. Accordingly variations in pressure in the chamber 70 of this valve, induced by temperature and pressure variations in the confined body of gas in the sensor tube 40, work against or are referenced to such constant absolute pressure maintained in the chamber 67 so as not to be influenced by variations in ambient pressure and altitude.

Thus, since the chambers 67, 67a each have one wall formed by the diaphragm 71 which also forms a wall for the chambers 70, 70a and since the pressure in each of these latter chambers 70 and 70a is responsive to the pressure on the gas trapped within its temperature responsive sensor tube 220 or 220a, it will be seen that the action of each temperature responsive sensor 220 and 220a in controlling its cryogenic liquid diaphragm flow valve 40, 40a is rendered accurately responsive to changes in temperature in the chambers 20 and 21 and is not influenced by changes in ambient pressures as the truck goes upgrade and downgrade to different altitudes.

*Safety cut off on opening door*

If liquid nitrogen is used as the cryogenic liquid, it will not, of course, support life, and can easily be fatal, particularly as one has no warning, such as choking or other discomfort, that he is breathing nitrogen and not air. To this end the flow of liquid nitrogen to the refrigerated spaces 20, 21 is completely cut off as soon as the operator opens the rear door 15, and since the heavy gaseous nitrogen in the body rapidly flows out of either refrigerated space 20 or 21 on opening the doors 15 and 22, the operator can enter these refrigerated spaces with complete safety so long as the rear door 15 is left open.

Thus the moment the operator opens the door 15 he closes the normally open spring locked safety shut-off valve 291 the stem 296 of which is in contact with the door 15, when the door is closed, to hold the valve open. As a consequence of this opening of the door 15 gas from the cryogenic liquid cannot escape from line 305 through the altitude compensator aneroid 279 and gas pressure builds up in this line 305, as well as the lines 306 and 306a connected therewith, these lines being supplied with gas from the cryogenic heaters 314, 314a via the lines 316, 316a and chambers 67, 67a.

Confining attention to the cryogenic liquid diaphragm flow valve 40, this rising pressure in the line 306 raises the pressure in the chamber 67 above the diaphragm 71 thereby to depress this diaphragm and close the valve head 47 against the seat 45. Accordingly the flow of cryogenic liquid through the cryogenic liquid diaphragm flow valve 40 to the spray tree 186 serving the refrigerated compartment 20 is cut off.

In similar manner, the increased pressure in the line 306a cuts off the flow of cryogenic liquid through the cryogenic liquid diaphragm flow valve 40a to the spray trees 186a and 186b serving the refrigerated compartment 21, description of the operation of the parts of this system, distinguished by these suffixes a not being repeated.

*No-load cut off*

A feature of the invention resides in the provision of means for cutting off the flow of cryogenic liquid to that area of the truck body which is unoccupied by cargo.

Thus when the truck body is completely filled with cargo the weight of the cargo on the several floor boards 23, 23a, 23b serves to close the several valves 209, 209a and 209b, thereby to prevent the control lines 205, 205a and 205b from becoming pressurized.

Assuming, however, that the load is removed from the floor panel 23b, this panel will be pushed up by its spring 26b. This permits the normally open valve 209b to open and accordingly gas from the heating coil 144 via line 212 passes through this now open valve 209 to the line 205. This pressurizes the chamber 196b of the diaphragm shut-off valve 185b so as to drive its diaphragm 194*b* downwardly. This closes the valve head 188*b* against its seat and hence cuts off the flow of cryogenic liquid from the line 49*a* to the spray tree or spurge line 186*b*. Accordingly the supply of cryogenic liquid to the now empty space above the floor panel 23*b* is cut off and waste of cryogenic liquid is avoided.

Similarly as the floor panels 23*a* and 23 are progressively unloaded their valves 209*a* and 209, respectively, through the diaphragm shut-off valves 185*a* and 185, respectively, cut off the supply of cryogenic liquid progressively to the spray trees or spurge lines 186*a* and 186.

*Manual cut-off of different spray trees*

In addition to this automatic cut-off of cryogenic liquid to any spray tree 186, 186*a*, 186*b* when the corresponding floor panel 23, 23*a* or 23*b* therebelow is relieved of load, any of these spray trees can be manually rendered inoperative by opening the corresponding manual valve 216, 216*a* or 216*b*. Confining attention to, say, the manual valve 216, when this is opened, control pressure from the top of the heater 144 is admitted via line 212 into line 205*b* to depress diaphragm 194*b* of the diaphragm shut-off valve 185*b* and close its valve head 188*b*. This cuts off the flow of cryogenic fluid to the spray tree 186*b* at the rear of the body 10.

MODIFICATION, FIG. 5, TEMPERATURE SETTING

In FIG. 5 is illustrated a modified form of mechanism for setting a temperature controller for a cryogenic liquid diaphragm flow valve to maintain different temperatures within the enclosed space being refrigerated, the cryogenic liquid diaphragm flow valve generally conforming to the cryogenic liquid diaphragm flow valve designated at 40 in the form of the invention shown in FIGS. 1–4. This modified form of temperature setting mechanism illustrated in FIG. 5 includes a cryogenic liquid diaphragm flow valve designated by the numeral 320 having a hollow metal body 321 of a flow valve section indicated generally at 322 the diaphragm control section of which is indicated generally at 323. This flow valve body 321 provides an inlet chamber 324 surrounded by a valve seat 325 the inlet chamber 324 being connected with the line 46 as with the form of the invention shown in FIGS. 1–4. A valve head 327 in the outlet chamber 328 of the valve body 321 controls the discharge of cryogenic liquid to the outlet line 49 in the same manner as with the form of the invention shown in FIGS. 1–4.

This valve head 327 is provided with a tubular valve stem 330 open at its outboard end and housing a rod 331 having its rounded contained end 332 seated against the valve head 327. This rod 331 extends through an oversize throughbore 333 of a block or head 334 of heat insulating material, preferably being made of glass and mica molded into the form of a cylinder, having one end seated against a gasket 335 surrounding and closing the opening to the outlet chamber 328 so as to provide a splash guard for the liquid nitrogen or other cryogenic liquid 30 contained therein.

The body 338 of the diaphragm control section 323 seats against the top of the marginal part of a disk 339 which in turn seats against an annular seat 340 surrounding the open end of a bellows chamber 341, this bellows chamber communicating with the oversize throughbore 333. Gaskets 342 are interposed between the margin of the metal disk 339 and the block 334, and the metal body 338 in the disk 339 has a central opening 343 and a downwardly projecting outwardly beaded annular flange 344 to the exterior of which is secured, as by welding, the upper end of an axially extensible metal bellows 345, this bellows preferably comprising a series of circular corrugations for this purpose. This bellows is preferably thin-walled and for this purpose made of nickel electrodeposited upon an erodible form (not shown) which is later removed. The lowest corrugation of this bellows is secured, as by welding, to the rim of a disk 346 which is integral with a pin 348 which projects upwardly through the opening 343 in the disk 339. The upper end of the valve stem 331 loosely seats against the lower end of the pin 348 and the chamber 349 within the bellows 345 is in communication, via the opening 343, with a diaphragm or control chamber 350 below a diaphragm indicated generally at 351.

The diaphragm 351 is shown as comprising a central metal disk 352 to which a flexible rim 353 is suitably secured, the margin of this rim being clamped against the top face of the metal body 338 by a coaxially cylindrical cap 354 for this body. This cap is shown as secured to this body 338 and also to the body 321 for the flow valve section 322 by tie bolts 355. The central disk 352 of the diaphragm 351 is shown as having a central hub 356 and the upper end of the pin 348 is shown as being threadedly secured to the hub 356. This hub 356 is also externally threaded to receive the hub of a clamping disk 358 for clamping the central part of the flexible diaphragm disk 353 against the bottom disk 352. This clamping disk 358 also forms the seat for the lower end of a helical compression spring 360. The upper end of this spring bears against the bottom of a piston-like disk 361 the rim of which is in closely spaced relation to, but not in sealed engagement with, the bore of the coaxial cylindrical cap 354. The chamber 362 within the coaxial cylindrical cap 354 connects with the line 306 in the same manner as with the form of the invention shown in FIGS. 1–4, and the piston-like disk 361 loosely supports the lower end of a piston rod 363 which extends outwardly from the coaxial cylindrical cap 354 and externally thereof is provided with a rack 364. This rack engages and oscillates a segmental gear 365 journalled on the plate 366 as indicated at 368 and having fixed thereto a pointer 369. This pointer transverses a scale 370 calibrated in degrees of temperature and associated with each temperature increment is a detent button or depression 371 which cooperates with a mating detent depression or button (not shown) on the pointer 369 to hold this handle in any set position.

As with the form of the invention shown in FIGS. 1–4, the line 222 connects with the chamber 350 below the diaphragm 351 of the cryogenic liquid diaphragm flow valve 320. Also, as with the form of the invention shown in FIGS. 1–4, the chamber 362 is supplied with gas developed from the cryogenic liquid, this gas being supplied to this chamber from the line 316 and its pressure in this chamber being maintained at a constant absolute value via the line 302 and an aneroid valve (not shown).

OPERATION OF FIG. 5

The operation of the temperature regulator shown in FIG. 5, so far as being responsive to the sensor tube 220 in controlling the temperature within the refrigerated space through regulation of the flow of cryogenic liquid to the space is substantially the same as with the cryogenic liquid diaphragm flow valve 40 or 40*a* with the form of the invention shown in the FIGS. 1–4. Thus, confining our attention to the compartment 20, FIG. 1, at the forward end of the body 10, if the temperature rises above a predetermined value, the gas being recirculated through the sensor tube 220 warms up and expands thereby to increase in pressure. Through the lines 221 and 222 this increases the pressure in the chamber 350, FIG. 5. This raises the diaphragm 351 so as to permit the valve head 327 to move away from its seat 325. Accordingly an increased amount of cryogenic liquid from the Dewar bottle 31 will flow via lines 35, 37 and 46 past the opened valve head 327 into the lines 49 and 198 to be discharged into the compartment 20 by the spray tree 186 thereby to reduce the temperature in this chamber to the predetermined value. When this occurs the gas within the sensor tube 220 contracts to reduce the pressure within the control chamber 350 to such value that the constant absolute pressure maintained in the chamber 362 by line 306 depresses the diaphragm 351 to close the valve head 327 to the extent required to maintain this predetermined value of temperature within the compartment 20.

The distinction of the modified form of temperature regulator illustrated in FIG. 5 resides essentially in the mechanism whereby it can be manually adjusted to maintain different temperatures in the compartment 20. Thus if the operator desires to maintain a temperature within the compartment 20 of, say, −20° F., which is the lowest temperature on the scale 370, FIG. 5, he manually adjusts the pointer 369, FIG. 5, to the −20° calibration on the scale. Through the segmental gear 365, this raises the rack 364 thereby to reduce the downward pressure on the helical compression spring 360. Accordingly the yielding spring force holding the diaphragm 351 down is reduced whereby the gas pressure in the chamber 350 under this diaphragm raises it to move the valve head 327 away from its seat 325.

Accordingly an increased flow of cryogenic liquid from the Dewar bottle 31 via lines 35, 37 and 46 (FIG. 1) is permitted to flow past the opened valve head 327 into lines 49 and 198 (FIG. 1) to be discharged into the compartment 20 by the spray tree 186. This, of course, reduces the temperature within this refrigeration compartment 20, thereby to cool and contract and reduce the pressure of the gas contained within the sensor tube 220 and chamber 350, FIG. 5, thereby to depress the diaphragm 351 and move the valve head 327 toward its closed position so as to maintain the temperature within the refrigeration compartment 20 at this newly selected lower temperature of −20° F.

Figure 6:
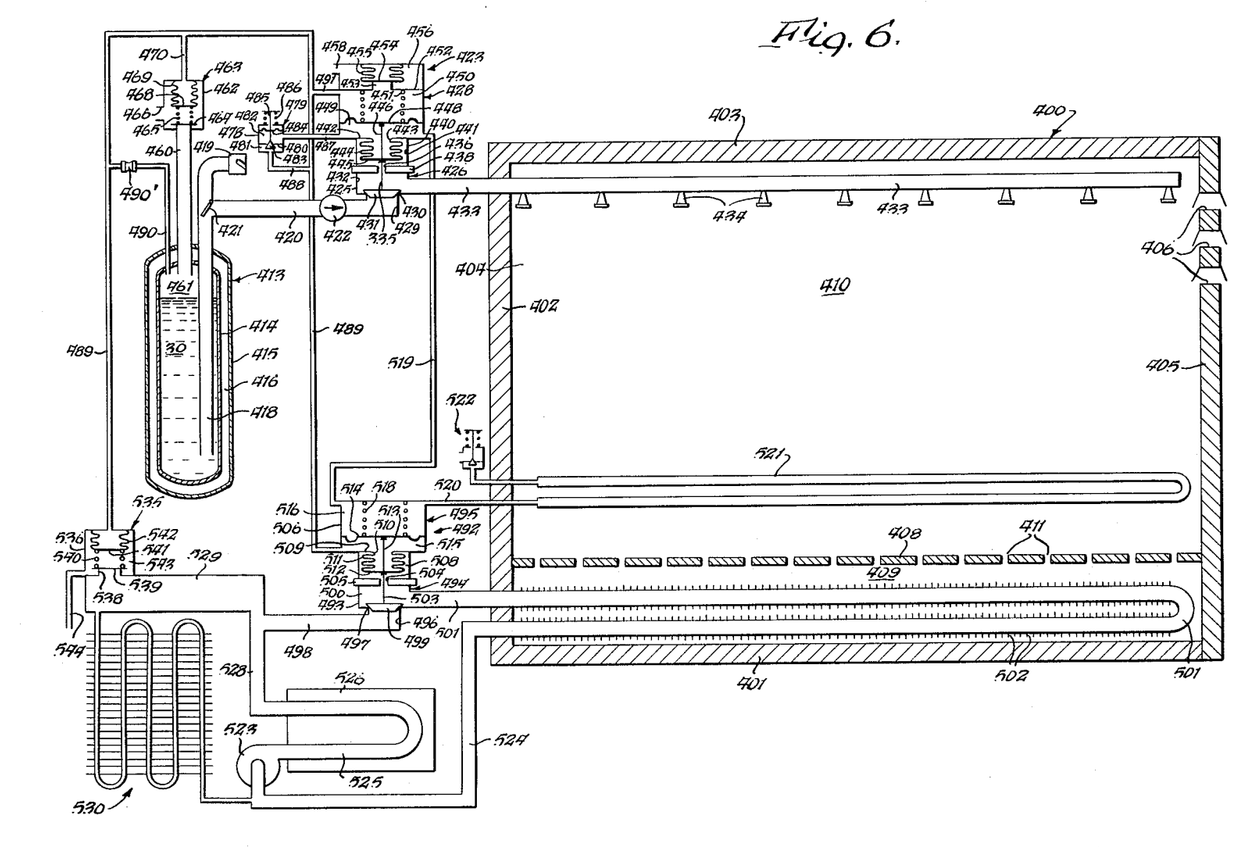
FIG. 6 is a diagramatic view of another form of apparatus using a cryogenic liquid to cool the interior of a highway truck body.

MODIFIED SYSTEM, FIG. 6

In FIG. 6 is illustrated another form of apparatus using a cryogenic liquid to cool the interior of a highway truck body, this form of the invention being characterized by the apparatus also supplying heat to heat the interior of the body when necessary.

In this form of the invention, the numeral 400 represents the body of a highway refrigerator truck which is shown as having a bottom wall 401, front wall 402, roof 403 and side walls 404 with its open rear end closed by a door 405 and which is provided in its upper part with louvered openings 406 through which the spent gas from the cryogenic liquid escapes to the atmosphere. The body is shown as having a perforated floor 408, arranged in spaced relation to the bottom wall 401 so as to provide a heater space 409 below the floor 408 and a storage space 410 above this floor. In order to permit circulation of air from the heater space 409 into the storage space 410, the perforated floor 408 is provided with openings or perforations 411 of adequate size.

The cryogenic liquid 30 is contained within a Dewar bottle indicated generally at 413 having an inner container 414 and an outer container 415 with suitable insulation in the space 416 between these containers. This bottle is provided with a tube 418 extending through the upper end heads of the containers 414 and 415 along one side of the side wall of the bottle with its upper end terminating in a filling coupling 419 and an outlet line 420 which branches from the tube 418, a flap 421 preferably being pivoted within the tube 418 at its juncture with the branch 420 and which flap is biased to direct the output from the Dewar bottle into the branch 420 but yielding under the flow of cryogenic liquid supplied from the inlet coupling 419 to permit filling of the bottle.

The cryogenic liquid outlet branch line 420 contains a check valve 422 and connects with a cryogenic liquid diaphragm flow valve indicated generally at 423, this flow valve controlling the discharge of cryogenic liquid into the storage compartment 410. This cryogenic liquid diaphragm flow valve has a hollow body 425 of a flow valve section, indicated generally at 426, the diaphragm control section for which flow valve is indicated at 428. This flow valve body 425 provides an inlet chamber 429 the outlet from which is surrounded by a valve seat 430, the inlet chamber 429 connecting with the branch liquid cryogenic supply line 420.

A valve head 431 in the inlet chamber 429 of the flow valve body 425 controls the discharge of cryogenic liquid through an outlet chamber 432 to an outlet line 433 which extends horizontally into the refrigeration space 410 within the truck body and is provided with a series of nozzles 434 through which the cryogenic fluid, in gas or liquid form, is discharged into the top of the space 410 to refrigerate the same.

The valve head 431 of the flow valve section 426 is provided with a valve stem 435 extending through an oversize throughbore 436 of a block or head 438 of heat insulating material, preferably being made of glass and mica molded into the form of a cylinder, having one end seated around an opening in the valve body 425 to the outlet chamber 432 so as to provide a splash guard for the liquid nitrogen or other cryogenic liquid 30.

The body 440 of the diaphragm control section 428 is shown as secured against the top of the insulation block 438 in any suitable manner. This insulation block 438 forms the bottom of a diaphragm chamber 441, the upper wall of which is provided by a disk 442 secured at its outer margin to the body 440 and having an opening 443 at its center. To the rim of this opening is secured, as by welding, the upper end of an axially extensible metal bellows 444, this bellows preferably comprising a series of circular corrugations for this purpose. This bellows is preferably thin-walled and for this purpose made of nickel electro-deposited upon an erodible form (not shown) which is later removed. The lowest corrugation of this bellows is secured, as by welding to the outer rim of a disk 445.

The disk loosely seats against the upper end of the valve stem 435 and is provided with a fixed stem 446 which projects upwardly and loosely seats against the bottom of a diaphragm 448, the outer rim of which is suitably secured to the wall of the body 440 of the diaphragm control section 428 so as to provide a diaphragm or control chamber 449 the top wall of which is provided by the diaphragm 448 and the bottom wall of which is provided by the bellows 444. The chamber above this diaphragm 448 is indicated at 450.

This diaphragm 448 forms a seat for the lower end of a helical compression spring 451, the upper end of which bears against the underside of a horizontal partition 452 across the upper end of the body 440 of the diaphragm control section 428. This partition is provided with a central opening 453, the rim of which is formed to provide an upwardly directed valve seat closed by the bottom disk 454 of an aneroid bellows 455 the upper end of this aneroid bellows being sealed to the top wall to an aneroid chamber 456 which forms the uppermost chamber of the body 440 of the controller section 423. This aneroid chamber 456 is open to ambient through a vent 459. Again, it is an important feature of this aneroid valve that the effective area of the valve seat surrounding the opening 453 be equal to the effective area of the aneroid bellows 455.

Referring to the Dewar bottle 413, the numeral 460 represents a tube having its open end in communication with the gas space 461 above the body 30 of cryogenic liquid, and its other end extending into the body 462 of a vent relief valve 463 and forming a seat for a disk 464 held against the end of this tube 460 by a helical compression spring 465. This vent relief valve body 462 is vented to the atmosphere, as indicated at 466, and the upper end of the helical compression spring 465 seats against a disk 468 forming the lower end head of an axially extensible bellows 469. The opposite end of this bellows is secured, as by welding, to the end head of the vent relief valve body 462 and a control line 470 communicates with the interior of this bellows 469 and controls the action of the vent relief valve 463, as hereinafter described.

The numeral 478 represents the body of a thermal sensor charge valve 479, this valve body having a central partition 480 forming an inlet chamber 481 and an outlet chamber 482. This partition 480 is provided with a central downwardly facing seat against which a valve head 483 seats, this valve head being fast to a stem extending through the opening in the partition 480 and being connected at its upper end with a diaphragm 484 forming the upper end of the outlet chamber 482. A pin 485 projects upwardly through an ambient vent in the body 478 and is biased outwardly by a helical compression spring 486 which normally holds the valve head 483 closed. The outlet chamber 482 is connected by a line 487 with the diaphragm control chamber 449.

The thermal sensor charge valve 479 is connected by a branch 488 with a main control line 489. This main control line 489 is supplied with gas from the gas head 461 in the Dewar bottle 413 by a line 490 containing a restricted orifice 490' which limits the supply of gas to this main control line 489. One branch 491 of this main control line 489 is connected to the chamber 450 in the diaphragm control section 428 above the diaphragm 448. This main control line 489 also connects with the line 470 of the vent relief valve 463. One end of this main control line 489 also connects with a diaphragm regulator 492 which controls the supply of heat to the refrigeration space 410 when required. This heat regulator 492 is generally similar to the cryogenic liquid diaphragm flow valve 423.

The regulator has a hollow body 493 of a flow valve section indicated generally at 494, the diaphragm regulator section for which flow valve is indicated at 495. This flow valve body 493 provides an inlet chamber 496, the outlet from which is surrounded by a valve seat 497, the inlet chamber 496 connecting with a heating medium supply line 498. A valve head 499 in the inlet chamber 496 of the flow valve body 493 controls the discharge of heating medium through an outlet chamber 500 to an outlet line 501 which extends into the space 409 below the perforated floor 408 of the truck body and within this space is preferably provided with fins 502 or other extended surface to provide improved heat transfer from the heating medium flowing through this pipe to the air within the space 409 and thence to the air within the cargo space 410.

The valve head 499 of the flow valve section 494 is provided with a valve stem 503 extending through an oversize bore 504 of a block or head 505 of heat insulating material, in the form of a cylinder having one end seated around an opening in the valve body 493 to the outlet chamber 500.

The body 506 of the diaphragm control section 495 is shown as secured against the top of the insulation block 505 in any suitable manner. This insulation block 505 forms the bottom of a diaphragm chamber 508, the upper wall of which is provided by a disk 509 secured at its outer margin to the body 506 and having an opening 510 at its center. To this rim of this opening is secured, as by welding, the upper end of an axially extensible metal bellows 511, this bellows preferably comprising a series of circular corrugations for this purpose. This bellows is preferably thin-walled and for this purpose made of nickel electro-deposited upon an erodible form which is later removed. The lowest corrugation of this bellows is secured, as by welding, to the outer rim of a disk 512.

This disk seats loosely against the upper end of the valve stem 503 and is provided with a fixed stem 513 which projects upwardly and loosely seats against the bottom of a diaphragm 514, the outer rim of which is suitably secured to the wall of the body 506 of the diaphragm control section 495 so as to provide a diaphragm or control chamber 515, the top wall of which is provided by the diaphragm 514 and the bottom wall of which control chamber is provided by the bellows 511. The chamber above this diaphragm 514 is indicated at 516.

The diaphragm 514 forms a seat for the lower end of a helical compression spring 518, the upper part of which bears against the underside of the top wall of the body 506.

The control chamber 515 below the diaphragm 514 connects with the end of the main control line 489 and the chamber 516 above this diaphragm is connected by a line 519 with the control chamber 449 of the cryogenic liquid diaphragm flow valve 423.

Means are also provided for regulating the temperature to be maintained within the cargo space 410, these means regulating both the flow of cryogenic fluid into this space and also, when required, the flow of heating medium into the finned tube 501 in the space 409 below the perforated floor 408 of this cargo space. To this end a line 520 connects the chamber 516 with a tube 521 of any desired shape and positioned in any desired manner within the cargo space 410 the temperature of which it controls. As shown, this tube is in the form of a simple hairpin loop but as with the tube 220 in the form of the invention shown in FIGS. 1–4, it could be in the form of an endless rectangle with its legs close to the top wall 403, side walls 404, bottom wall 401 and front wall 402 so that its sensitivity as a sensor is not affected to any undue extent by any temperature differential between any of these walls and so that it is thereby sensitive to the average temperature conditions within the refrigeration compartment 410. The essential condition is that this tube be a closed tube connecting with the chamber 516 of the regulator 492 for the heat source and also, via the line 519, with the control chamber 449 of the cryogenic liquid diaphragm control valve 423. The outboard end of this sensor tube 521 can be provided with a manually operable valve 522 by means of which the sensor tube 521 can be purged of any fluid other than the gasified cryogenic liquid.

The heater for supplying the heating medium to the pipe 498 can be of any suitable form but is shown as comprising a circulating pump 523 for the heating medium which is preferably water containing sufficient anti-freeze medium to insure against freezing within the finned coil 501 at all times. The inlet to this pump 523 is connected by a line 524 to the outlet end of this finned heat transfer coil 501 and the outlet of this pump 523 connects with a heat transfer coil 525 within a chamber 526 through which the cooling water for the engine or prime mover (not shown) employed for propelling the truck can be circulated. The outlet line 528 from this heat transfer coil 525 connects both with the line 498 leading to the heat regulator 492 and also with a header or storage tank 529. A high resistance finned bypass coil 530 is also desirably provided around the pump 523 and heat source 526, one end of this bypass coil being connected at the inlet of the pump and the other end of this coil being connected to the header 529.

An overflow relief valve for the heating medium circulating through the finned heat transfer coil 501 is provided which is indicated generally at 535. This comprises a valve body 536 the lower wall of which is provided with an opening 538 leading to the space within the tank or header 529 and surrounded by an upwardly facing valve seat. This valve seat is engaged by a disk 539 biased to a closed position by a helical compression spring 540, the opposite end of which seats against the end head 541 of an axially extensible metal bellows 542, this bellows preferably comprising a series of circular corrugations for this purpose. This bellows is preferably thin-walled and for this purpose made of nickel electro-deposited upon an erodible form (not shown) which is later removed. The opposite corrugation of this bellows is secured, as by welding, to the top wall of this valve housing 536 and the chamber within this bellows is connected with one end of the main control line 489. The chamber 543 surrounding this bellows and into which the valve disk 539 opens is provided with a gravity overflow 544.

OPERATION OF MODIFIED SYSTEM, FIG. 6

As with the form of the invention shown in FIGS. 1–4 the cargo space 410 is assumed to be filled with the merchandise to be maintained at a predetermined temperature which can involve refrigerating the space by the use of the cryogenic liquid 30, such as liquid nitrogen at −320° F. or can involve the circulation of a heating medium from the heater 525, 526 as conditions may require.

Refilling with cryogenic liquid

Confining attention to the use of a cryogenic liquid in refrigerating the cargo space 410, this liquid is contained within the inner container 414 of the Dewar bottle 413 which, when it is exhausted, is refilled with cryogenic liquid from the inlet filling coupling 419, the incoming cryogenic liquid opening the flap 421 and flowing down the tube 418 to fill the inner container 414. The Dewar bottle 413 can be either vertical, as shown, or horizontal.

Flow of cryogenic liquid

In cooling the cargo space 410 of the truck body 400, cryogenic liquid flows out the tubes 418 and 420 past the check valve 422 into the cryogenic liquid diaphragm flow valve 423. With the valve head 431 of this flow valve open, the cryogenic liquid flows into the tube 433 which forms a spurge tube spray tree, the cryogenic liquid being discharged downwardly into the storage space 410 by the nozzles 434. This discharge of the cryogenic fluid can be either in liquid or gaseous form but immediately is converted into a gas surrounding the articles contained within the storage compartment 410 to chill the same and maintain them at the desired low temperature.

Exhaust of spent gas

This gas is, of course, heated in its service within the storage compartment 410 and this heavier-than-air spent gas flows toward the rear of the truck body 400 and rises to escape through the louvered openings 406 in the upper part of the rear door 405 of the truck body.

Low temperature control

When the temperature within the storage space 410 falls to the predetermined temperature, the flow of cryogenic liquid will be cut off or reduced to that value required merely to maintain the predetermined temperature in the storage space 410. Thus, if the temperature within the storage compartment 410 drops toward the predetermined temperature (determined by the setting of a temperature control, not shown in FIG. 6 but such as illustrated in FIGS. 1–5) the gas contained within the closed sensor tube 521 contracts and reduces in pressure. This reduces the pressure in line 520, chamber 516 of the heat regulator 492, line 519 and control chamber 449 of the diaphragm control section 428 of the cryogenic liquid diaphragm flow valve 423. This in turn depresses or moves the diaphragm 448 toward the insulation block 438, thereby to move the pin 446 and rod 435 in the direction to close the valve head 431 against its seat 430. When this occurs the flow of cryogenic liquid to the spray tree or spurge tube 433 is reduced or cut off until further cooling is called for.

Control pressure independent of changes in ambient pressure

It will also be seen that the aneroid bellows 455 serves the same function as the aneroid bellows 284 in the form of the invention shown in FIGS. 1–4, that is, it maintains a constant absolute reference pressure in the chambers 450, 515 and bellows 469 and 542, via lines 489 and 470, in spite of changes in ambient pressure, thereby to compensate for changes in altitude of the vehicle being served. The purpose of so maintaining this reference pressure constant is to maintain accuracy of temperature control and to avoid useless loss by boil-off of the cryogenic liquid as the truck goes to higher elevations, or loss of Dewar bottle head pressure as the truck descends to lower altitudes. The maintenance of this constant absolute reference pressure is a function of the equality of the effective size of the bellows 455 and the valve seat surrounding the opening 453 and which renders the movement of the bellows head 454 responsive only to the spring back pressure of the bellows 455 and not to changes in ambient pressure surrounding the bellows.

Heating system

When heat, instead of cryogenic cooling fluid, is required in the storage space 410 the temperature and pressure in the sensor tube 521 has dropped to such value in it and in the control chamber 449 of the cryogenic liquid diaphragm flow valve 423 as to depress the diaphragm 448 sufficiently to close the valve head 431 and prevent the passage of any cryogenic liquid from the Dewar bottle 413 to the spray tree 433. Accordingly the supply of coolant to the storage space 410 is cut off.

At the same time this low gas pressure developed in the sensor tube 521 in it and in the control chamber 516 of the heat regulator 492 serves to raise the diaphragm 514 of the latter and, through the rods 513 and 503, lift the valve head 499 from its seat 497. Accordingly heating medium, such as water containing an anti-freeze medium and heated on passage through the heating coil 525, is circulated through the finned heating coil 501 below the perforated floor 408 of the storage space 410. The movement of heating medium is effected by the pump 523 which forces the heating medium through the coil 525 of the heater and thence through lines 528 and 498 past the now open valve head 499 into the finned heating coil 501 in the space 409 below the perforated floor of the storage space 410. The spent heating medium returns to the inlet of the pump 523 via line 524, and the high resistance radiator 530 in parallel with the pump 523 and heater 525, 526 serves to adjust the temperature of the heating medium supplied to the finned coil 501.

From the foregoing it will be seen that this method and apparatus of the present invention achieves the objects and has the advantages previously set forth.

I claim:

1. Apparatus for maintaining in an enclosed space an atmosphere of a gas generated from a cryogenic liquid which comprises an enclosed container containing said cryogenic liquid, a relief valve arranged to discharge gas developing as a head in said container from said cryogenic liquid contained therein, a conduit having its inlet end communicating with the body of cryogenic liquid in the bottom of said container and leading toward said enclosed space, valve means regulating the flow of said liquid through said conduit, means responsive to gas pressure opening and closing said relief valve to adjust the head pressure of said gas head against the body of cryogenic liquid contained in said container, aneroid means maintaining said gas pressure substantially constant and independent of changes in ambient pressure, and means conducting the discharge from said valve means into said enclosed space.

2. Apparatus for maintaining in an enclosed space an atmosphere of a gas generated from a cryogenic liquid which comprises an enclosed container containing said cryogenic liquid under pressure, a first conduit having its inlet end communicating with the body of cryogenic liquid in said container, a diaphragm valve controlling the discharge of cryogenic liquid from said first conduit, including a valve head controlling said discharge, said diaphragm valve including means defining a control chamber on one side of its diaphragm and one wall of which is formed by said diaphragm, means responsive to the temperature in said enclosed space for pressurizing and varying the pressure in said control chamber, comprising a closed sensor tube in said enclosed space containing a gas the pressure of which varies in response to temperature changes in said enclosed chamber, and means placing the interior of said sensor tube in communication with said control chamber, and a second conduit connecting the discharge from said diaphragm valve to said enclosed space.

3. Apparatus as set forth in claim 2 additionally including means positively circulating said gas in said sensor tube to increase the sensitivity thereof.

4. Apparatus as set forth in claim 2 additionally including means manually adjusting a yielding back pressure against said valve head to maintain adjustably variable temperatures in said enclosed space.

5. Apparatus as set forth in claim 2 additionally including means manually adjusting the pressure in said control chamber and sensor tube to maintain adjustable variable temperatures in said enclosed space.

6. Apparatus as set forth in claim 5 wherein said manual adjusting means comprises a bellows forming a chamber in communication with said control chamber and sensor tube, and means manually adjusting said bellows to adjust the volume of said chamber to different values.

7. Apparatus as set forth in claim 4 wherein said manual adjusting means comprises a spring urging said valve head to a closed position, a follower for said spring and means manually adjusting the position of said follower to vary the pressure of said spring against said valve head.

8. Apparatus for maintaining in an enclosed space an atmosphere of a gas generated from a cryogenic liquid, which comprises an enclosed container containing said cryogenic liquid from which gas is generated, a control line receiving said generated gas, aneroid means maintaining the gas in said control line at a substantially constant absolute pressure independent of changes in ambient pressure, a first conduit having its inlet end communicating with the body of cryogenic liquid in said container, a diaphragm valve regulating the discharge of cryogenic fluid from said conduit, said diaphragm valve including means defining a chamber on each side of its diaphragm and one wall of each of which chambers is formed by said diaphragm, one of said chambers being in communication with and pressurized by said control line, means pressurizing and adjusting the gas pressure in the other of said chambers in response to temperature variations in said enclosed space, and a second conduit conducting the discharge from said daphragm valve to said enclosed space.

9. Apparatus as set forth in claim 8 wherein said means adjusting the gas pressure in said other said chamber comprises a closed sensor tube and a line establishing communication between the interior of said sensor tube and said other of said chambers.

10. Apparatus as set forth in claim 9 additionally including means for supplying gas generated from said cryogenic liquid into said sensor tube and said other of said chambers.

11. Apparatus as set forth in claim 8 additionally including a restricted orifice in said means passing the generated gas into said control line.

12. In apparatus for maintaining in an enclosed space an atmosphere of a gas generated from a cryogenic liquid, means for supplying gas for control purposes, comprising an enclosed container containing the liquid from which said gas is generated, a diaphragm valve controlling the escape of liquid from said container with its diaphragm forming one wall of a control chamber on one side and one wall of a reference pressure chamber on its other side, a heating coil connected at one end with the outlet of said valve and generating gas from the liquid discharged by said valve, a control line at the other end of said heating coil and receiving gas generated by said heating coil and communicating with said control chamber, means actuating said valve in response to the differential between the pressure in said control line and a restricted supply of pressurized gas communicating with said reference pressure chamber, and aneroid valve means venting said pressurized gas in response to the pressure differential between the end ambient to maintain said restricted supply of pressurized gas at a substantially constant absolute pressure independent of changes in ambient pressure.

13. In combination with a truck body forming an enclosed space, partition means movable across the interior of said enclosed space to divide said enclosed space into two compartments and movable to permit access from one compartment to the other, an enclosed conduit, means supplying pressurized cryogenic fluid to the inlet end of said conduit, a pair of valves controlling the discharge of said cryogenic fluid from the downstream end of said conduit, a second conduit conducting the discharge of one of said valves to one of said compartments, means responsive to the temperature in said one of said compartments and controlling said one of said valves, a third conduit conducting the discharge of the other of said valves to the other of said compartments, and means responsive to the temperature in the other of said compartments and controlling said other of said valves, whereby temperatures of different values can be maintained in said compartments.

14. In combination with a truck body forming an enclosed space, means separating said space into at least two chambers, a vertically movable floor member in each of said chambers, means biasing said floor members upwardly when relieved from the burden of a load thereon, an enclosed conduit, means supplying pressurized cryogenic fluid to the inlet of said conduit, a pair of valves controlling the discharge of said cryogenic fluid from the downstream end of said conduit, a second conduit conducting the discharge of one of said valves to one of said chambers, means responsive to the upward movement of that vertically movable floor member in said one of said chambers closing said one of said valves to cut off flow of cryogenic fluid to the unoccupied space in said one of said chambers, a third conduit conducting the discharge of the other of said valves to the other of said chambers, means responsive to the upward movement of the other of said vertically movable floor members closing said other of said valves to cut off the flow of cryogenic fluid to the unoccupied space in said other of said chambers.

15. The combination set forth in claim 14 additionally including manual means selectively rendering either of said valves inoperative.

References Cited by the Examiner

UNITED STATES PATENTS

| | | | |
|---|---|---|---|
| 2,211,567 | 8/1940 | Henney | 165—42 |
| 2,657,542 | 11/1953 | Wildhack | 62—51 X |
| 2,881,600 | 4/1959 | Elfving | 62—239 |
| 2,890,123 | 6/1959 | Brown et al. | 62—64 |
| 2,993,346 | 7/1961 | Mills | 62—64 |
| 3,062,017 | 11/1962 | Balcar et al. | 62—50 |
| 3,091,096 | 5/1963 | Rendos et al. | 62—52 |
| 3,097,497 | 7/1963 | Fitt | 62—52 |
| 3,127,755 | 4/1964 | Hemery | 62—267 |
| 3,153,441 | 10/1964 | Pippert et al. | 165—42 |

ROBERT A. O'LEARY, *Primary Examiner.*

CHARLES SUKALO, *Examiner.*

M. A. ANTONAKAS, L. L. KING, *Assistant Examiners.*